(12) United States Patent
Shitara et al.

(10) Patent No.: US 6,473,258 B1
(45) Date of Patent: Oct. 29, 2002

(54) MAGNETIC DISK READ/WRITE CIRCUIT HAVING CORE COILS OF OPPOSITE PHASE

(75) Inventors: Kenichi Shitara; Kazuo Honma, both of Kanagawa-ken (JP)

(73) Assignee: Hitachi Electronics Engineering Co., Ltd., Tokyo (JP)

( * ) Notice: Subject to any disclaimer, the term of this patent is extended or adjusted under 35 U.S.C. 154(b) by 78 days.

(21) Appl. No.: 09/662,626

(22) Filed: Sep. 15, 2000

(51) Int. Cl.[7] .................................................. G11B 5/02
(52) U.S. Cl. ........................ 360/67; 360/317; 360/124; 360/68
(58) Field of Search .......................... 360/67, 317, 318, 360/123, 124, 31, 68, 46, 53

(56) References Cited

U.S. PATENT DOCUMENTS 4,644,432 A * 2/1987 Heim ........................ 360/123
5,164,869 A * 11/1992 Fontana, Jr. et al. ........ 360/126

* cited by examiner

Primary Examiner—Alan T. Faber
(74) Attorney, Agent, or Firm—Mattingly, Stanger & Malur, P.C.

(57) ABSTRACT

A magnetic disk read/write circuit comprises a core having a pair of coils wound such that signals supplied to the coils becomes opposite in phase and a read circuit having a first input terminal connected to one of terminals of a read head through one of the coils to receive a read signal from the read head and a second input terminal connected to the other terminal of the read head through the other coil to receive the read signal from the read head or a write circuit in which the read head is a write head, the signal at the first input terminal is a signal at the first output terminal and the signal at the second input terminal is a signal at a second input terminal.

11 Claims, 4 Drawing Sheets

WRITE SIGNAL

TRACK MAGNETIZATION

READ SIGNAL

POSITIVE PHASE

NEGATIVE PHASE

READ SIGNAL WITH NOISE

POSITIVE PHASE

NEGATIVE PHASE

MAGNETIC DISK READ/WRITE CIRCUIT HAVING CORE COILS OF OPPOSITE PHASE

BACKGROUND OF THE INVENTION

1. Field of the Invention

The present invention relates to a magnetic disk read/write circuit and, particularly, to a magnetic disk read/write circuit capable of improving S/N ratio of a read signal in such as a magnetic disk tester or a magnetic head tester, which uses a MR (Magneto Resistive) head, a GMR (Giant Magneto Resistive) head and a TMR (Tunnel Magneto Resistive) head as read heads.

2. Description of the Related Art

As a magnetic disk read/write head for a hard disk device, the so-called complex magnetic head including an inductive head (thin film head) as a write side head and a MR head, a GMR head and a TMR head as read side heads, all of which are mounted on a single slider, is widely used recently. Under the circumstance, the recent magnetic disk tester for testing a hard magnetic disk or the recent magnetic head tester for testing the magnetic heads uses such complex magnetic read/write head. However, since, with the recent improvement of the recording density of the magnetic disk, the frequency of a read/write signal is increased, the S/N ratio of a read signal is degraded, causing the accuracy of the test to be degraded.

FIG. 4(a) shows a write signal waveform for the inductive head (thin film head) on the write side, FIG. 4(b) shows a state of magnetization of a track on a magnetic disk corresponding to the write signal shown in FIG. 4(a), FIG. 4(c) shows a read signal waveform when the thin film head or the MR head reads the written data from the track of the magnetic disk and FIG. 4(d) shows the read signal waveform with noise.

The read signal waveform usually contains noise as shown in FIG. 4(d) and the larger the influence of noise is the higher the read frequency. Further, since the voltage level of the read signal is lowered with increase of the frequency, precise test becomes difficult.

Recently, in order to improve the efficiency of the test, a number of magnetic disks are used in one tester or the test of magnetic disks or magnetic heads is performed in parallel by arranging a number of test devices in parallel on one test table. In such test system, due to the use of high frequency in recording data, noise is induced in a MR head and a GMR head, which are located in the vicinity thereof and are in reading operation. Such noise is detrimental for the test result. In such case, noise frequencies observed in the MR head and the GMR head is usually even harmonics of the recording frequency and noise on the read signal shown in FIG. 4(d) becomes large.

SUMMARY OF THE INVENTION

An object of the present invention is to provide a magnetic disk read/write circuit capable of improving S/N ratio of a read signal from a magnetic head, particularly, a MR head or a GMR head.

In order to achieve the above object, a magnetic disk read/write circuit according to the present invention is featured by comprising a core on which a pair of coils are provided such that signals on the coils become opposite in phase and a read circuit having a first input terminal connected to one of terminals of a read head through one of the coils to receive a read signal from the read head and a second input terminal connected to the other terminal of the read head through the other coil to receive the read signal phase from the read head.

Since the read circuit receives the positive phase read signal and the negative phase read signal from the read head through the coils on the core, which are wound such that the signals supplied to the coils become opposite in phase, noises of the positive and negative read signals overlapped on signal lines as in-phase components, respectively, are cancelled out or restricted by the core.

As a result, it becomes possible to improve the S/N ratio of the read signal from the magnetic head to thereby realize a magnetic disk tester or a magnetic head tester, which can perform a high precision test.

Further, by providing a core having a pair of coils between a write head and a write circuit similarly, a rising and falling of a write signal current becomes substantially symmetrical, so that it is possible to obtain a read signal which is hardly influenced by noise.

DETAILED DESCRIPTION OF THE PREFERRED EMBODIMENTS

Figure 1:
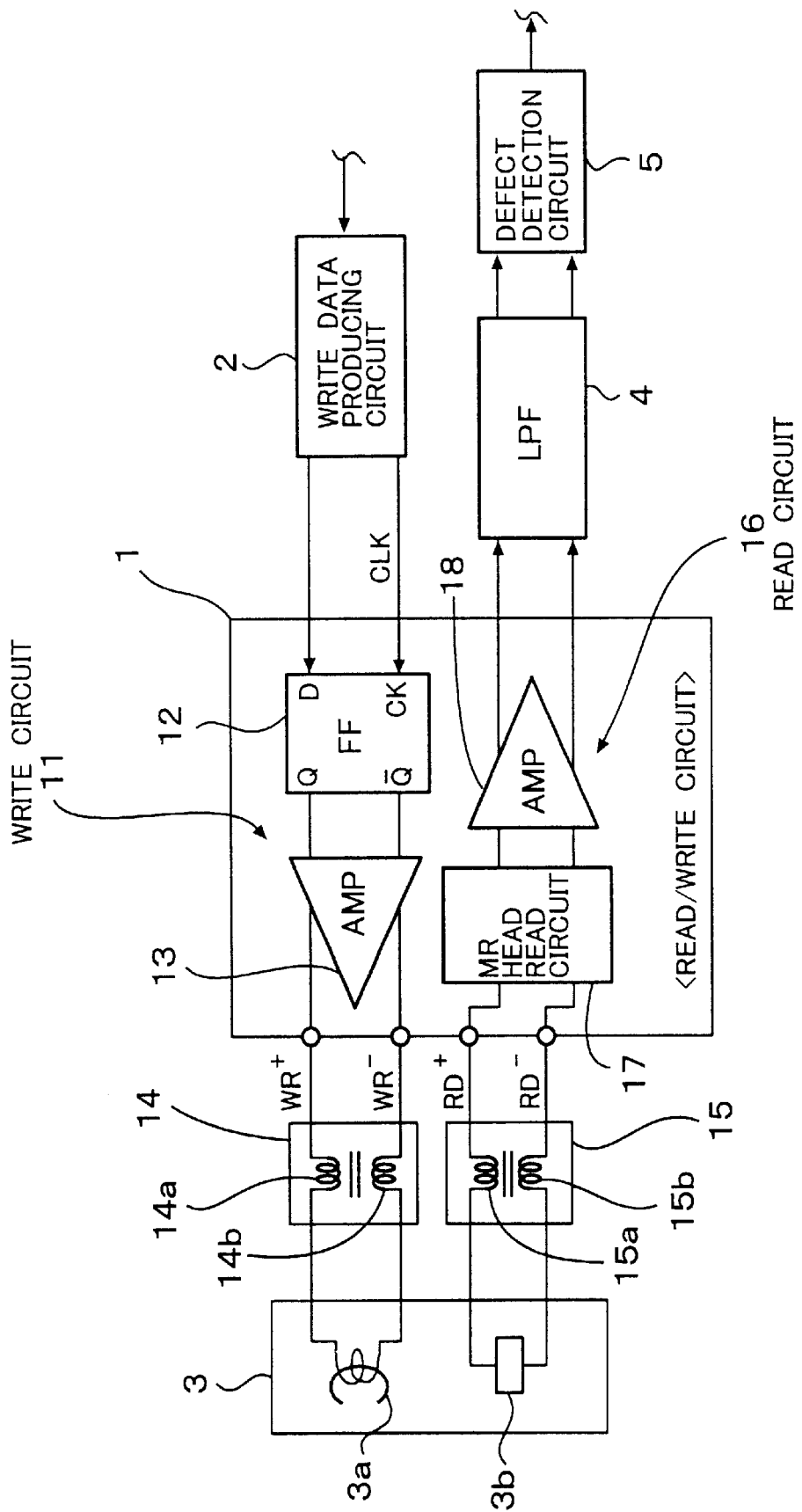
FIG. 1 is a block circuit diagram of a magnetic disk or head tester which includes a read/write circuit according to the present invention and uses a MR head as a read head.

In FIG. 1, a write data producing circuit 2 is adapted to read a predetermined test data whose state is changed between HIGH level and LOW level correspondingly to a test code such as "FFh", where h indicates hexadecimal and FFh indicates that all bits are 1, assigned by a control device (not shown) from a write data memory (not shown) and send it to a write circuit 11 of a read/write circuit 1.

A magnetic head 3 is constructed with an inductive head (thin film head) 3a and a MR head 3b.

The write circuit 11 is constructed with a D flip-flop 12 and a push-pull type or differential type amplifier 13. The test data from the write data producing circuit 2 is received at a D terminal of the D flip-flop 12 and the D flip-flop generates the write signal as Q output and Q bar output (inversion of Q output) thereof according to a clock CLK received by a CK terminal of the D flip-flop 12. The amplifier 13 receives the Q output and the Q bar output as the differential pulse signals, amplifies them and outputs a positive or inverted current to the two terminals of the inductive head 3a through the common mode choke coil 14 connected to a WR+ terminal (positive phase) and a WR-terminal (negative phase) of the differential amplifier. Therefore, the inductive head 3a writes the test data in a predetermined track of the magnetic disk.

On the other hand, the read circuit 16 includes a MR head read circuit 17 and a differential amplifier 18 and the MR head read circuit 17 supplies a bias current to the MR head 3b through the common mode choke coil 15 and, in response to positive phase and negative phase detection signals (read signals) with respect to a reference level of the read circuit 17, which are received from the MR head 3b at differential input terminals RD+ (positive phase side) and RD− (negative phase side), outputs positive phase and negative phase differential read signals (analog signals). The differential amplifier 18 amplifies the differential read signals and generates a positive and negative phase outputs. The positive and negative phase outputs are supplied to a defect detection circuit 5 through a low-pass filter 4. The positive phase output is received by a positive side peak follower type defect detection circuit of the defect detection circuit 5 and the negative phase output is received by a negative side peak follower type defect detection circuit to detect a defect of the magnetic disk.

Figure 4A:
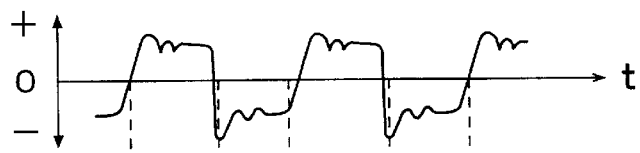
FIG. 4 shows waveforms of a write signal, a read signal, etc., of the read/write circuit.
Figure 4B:
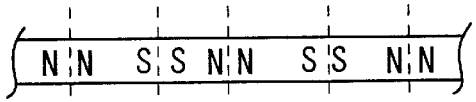
Figure 4C:
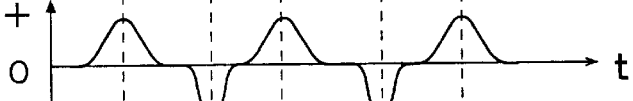
Figure 4C:
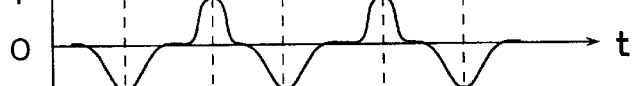
Figure 4D:
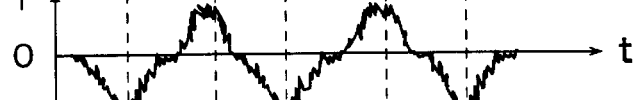
Figure 4D:

Each of the common mode choke coils 14 and 15 is formed by winding two coils on a ferrite core in mutually opposite directions as shown in FIG. 1 and is equivalent to a transformer having an input (primary side) and an output (secondary side). Therefore, the common mode choke coil may be such transformer. Since the coils 14a and 14b of the common mode choke coil 14 are wound in opposite direction and the coils 15a and 15b of the common mode choke coil 15 are wound in opposite direction, noise components in phase with the signal are cancelled out each other or restricted and only signals mutually opposite in phase appear on the output side. Therefore, noise on the write signal is restricted and noise on the read signal is also restricted, so that it is possible to obtain the read signal having a waveform which is substantially the same as that shown in FIG. 4(c).

Figure 2:
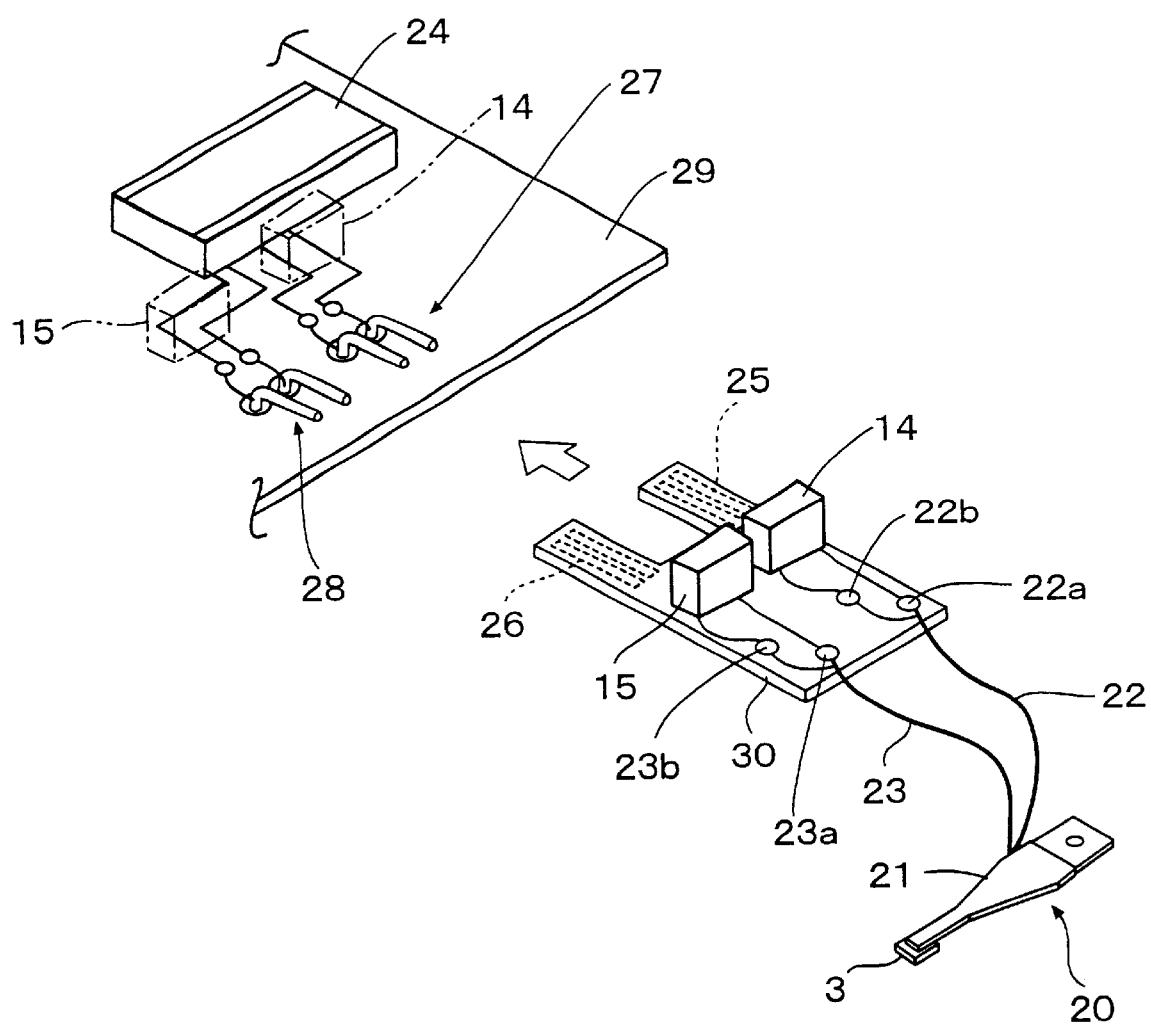
FIG. 2 is a perspective view of common mode choke coils to be mounted on a substrate.

FIG. 2 is a perspective view of a portion of the tester, illustrating a mounting of the common mode choke coils 14 and 15 on the read/write circuit 15.

In FIG. 2, a magnetic head assembly 20 includes a suspension spring 21 and the magnetic head 3 supported by a front end portion of the suspension spring 21 and a rear end portion of the suspension spring 21 is supported by a support arm (not shown) of a head carriage (not shown). The magnetic head 3 includes the inductive head 3a and the MR head 3b and two pairs of lead wires (not shown) extend along a surface of the suspension spring 21 to the respective heads.

External wire lines 22 and 23 connect the lead wires from the inductive head 3a and the MR head 3b to a pair of terminals 22a and 22b and a pair of terminals 23a and 23b, which are provided on an end portion of the paddle 30 on the side of the magnetic head assembly 20. A pair of female connectors 25 and 26 are formed on the other end portion, which is remote from the magnetic head assembly 20.

The common mode choke coils 14 and 15, which include the coils 14a and 14b and the coils 15a and 15b, respectively, are provided on the paddle 30. Input terminals of the common mode choke coil 14 are connected to the terminals 22a and 22b, respectively, and input terminals of the common mode choke coil 15 are connected to the terminals 23a and 23b, respectively.

A substrate 29 is provided on the side of the tester and the read/write circuit 1 in the form of an IC 24 is mounted on the substrate 29. Male connectors 27 and 28 are provided on a peripheral portion of the substrate 29 in the vicinity of the IC 24 to form electrical connections to the female connectors 25 and 26 on the paddle 30 when the latter is assembled to the substrate 29 to connect the inductive head 3a and the MR head 3b of the magnetic head assembly 20 to the write circuit 11 and the read circuit 16, respectively.

By mounting the common mode choke coils 14 and 15 on the paddle 30, it is possible to arrange the common mode choke coils 14 and 15 in the vicinity of the input/output terminals on the read/write circuit 1 on the existing substrate.

Since, in the magnetic head tester, the magnetic head assembly 20 is electrically connected to the external lead wires 22 and 23 through terminal contacts, frequently, the external wires 22 and 23 are soldered to the paddle 30 and the connectors 25 and 26 to the read/write circuit 1 are provided on the paddle 30. Therefore, it is possible to provide the common mode choke coils 14 and 15 and the magnetic head assembly 20 as a unit part to thereby facilitate an exchange of the part.

Incidentally, it may be possible to mount the common mode choke coils 14 and 15 on the substrate 29 directly. In such case, the common mode choke coils 14 and 15 may be arranged on the substrate 29 between the IC 24 and the male connectors 27 and 28 as shown by chain lines and the female connectors 25 and 26 are pressure-contacted directly to the external wires 22 and 23, respectively.

Figure 3A:
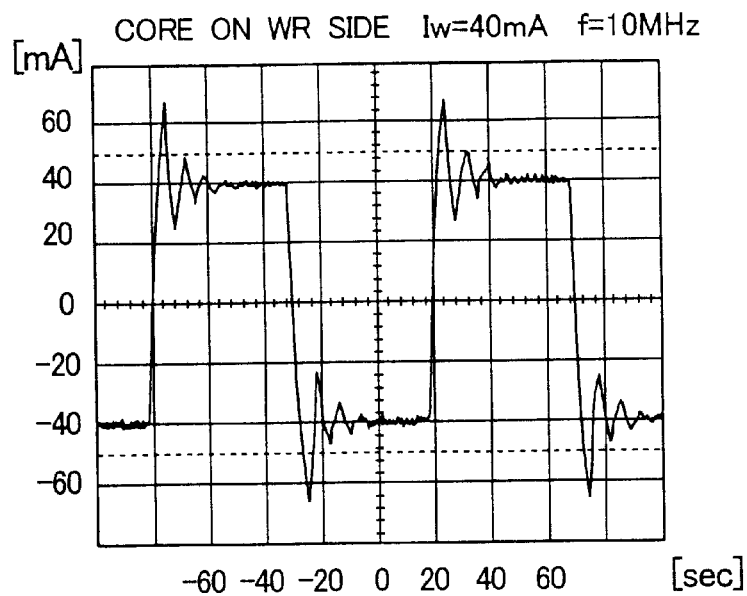
FIG. 3(a) shows a write current signal waveform when an inductive head is driven through a common mode choke.

FIG. 3(a) shows a waveform of a write current signal when the write inductive head (thin film head) is driven through the common mode choke coil 14. When the write head is driven with write current (IW) of 40 mA, drive pulse frequency (f) of 10 MHz, inductance of each of the coils 14a and 14b of 2.3 $\mu$H, inductance of the thin film head of 42 nH and resistance value of 175 $\Omega$, the rising and falling waveforms becomes symmetrical as shown.

Substantially the same waveform can be obtained with inductance of each of the coils 14a and 14b being in a range from 0.5 $\mu$H to 3.0 $\mu$H. In the state of track magnetization shown in FIG. 4(b), the border between S pole and N pole appears clearly. As a result, the peaks of the read signal shown in FIG. 4(c) becomes high, so that separation of the read signal from noise becomes easy even when the frequency is increased.

Figure 3B:
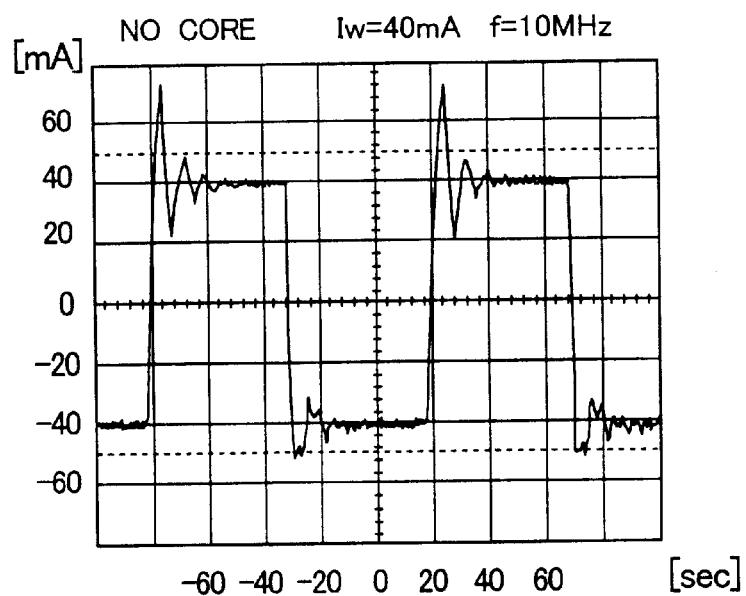
FIG. 3(b) shows a write current signal waveform when the common mode choke is not used.

On the other hand, the characteristics of the read signal waveform when the magnetic head 3 is connected directly to the read/write circuit 1 without using the common mode choke coils, the falling side of the waveform of the read signal is collapsed with respect to the rising side as shown in FIG. 3(b), making the read signal waveform asymmetrical. As a result, the border between S pole and N pole of the magnetized track becomes unclear, so that the rising and falling of the peaks of the read signal are broadened. Therefore, the separation of the read signal from noise becomes difficult when the frequency is increased.

Although, in this embodiment, the common mode choke coils are inserted into the output side of the write circuit and the input side of the read circuit, respectively, it may be possible to insert the common mode choke coil into the input side of the read circuit. However, it is better to insert them to the output side of the write circuit and the input side of the read circuit, respectively.

As mentioned previously, the common mode choke coils may be replaced by transformers.

Further, although the present invention has been described with reference to the magnetic disk tester, the present invention can be applied to the magnetic head tester as well.

What is claimed is:

1. A magnetic disk read/write circuit connected to a complex magnetic head including a write head and a read head mounted on a single slider, comprising:

a core having a pair of coils wound such that signals supplied to said coils become opposite in phase; and a read circuit having a first input terminal connected to one of terminals of a read head through one of said coils to receive a read signal from said read head and a second input terminal connected to the other terminal of said read head through the other coil to receive the read signal from said read head.

2. A magnetic disk read/write circuit connected to a complex magnetic head including a write head and a read head mounted on a single slider, comprising:

a core having a pair of coils wound such that signals supplied to said coils become opposite in phase; and a read circuit having a first input terminal connected to one of terminals of a read head through one of said coils to receive a read signal of positive phase from said read head and a second input terminal connected to the other terminal of said read head through the other coil to receive the read signal of negative phase from said read head.

3. A magnetic disk read/write circuit as claimed in claim 2, wherein said core is either a choke coil or a transformer.

4. A magnetic disk read/write circuit as claimed in claim 3, wherein said second input terminal is opposite in phase to said first input terminal.

5. A magnetic disk read/write circuit as claimed in claim 3, wherein said read head is said write head, said read circuit has first and second output terminals and is a write circuit for writing data in a magnetic disk, the signal at said first input terminal is a signal at said first output terminal and the signal at said second input terminal is a signal at said second output terminal.

6. A magnetic disk read/write circuit as claimed in claim 5, wherein said second output terminal is opposite in phase to said first output terminal.

7. A magnetic disk read/write circuit as claimed in claim 2, further comprising:

a second core having a pair of coils wound such that signals supplied to said coils become opposite in phase; and a write circuit having a first output terminal connected to one of terminals of said write head through one of said coils of said second core and a second output terminal connected to the other terminal of said write head through the other coil of said second core, for writing data in a magnetic disk through said write head.

8. A magnetic disk read/write circuit as claimed in claim 7, wherein said second core is either a choke coil or a transformer.

9. A magnetic disk read/write circuit as claimed in claim 8, wherein a signal at said second output terminal is opposite in phase to a signal at said first output terminal.

10. A magnetic disk read/write circuit comprising;

a core having a pair of coils wound such that signals supplied to said coils become opposite in phase; and a write circuit having a first output terminal connected to one of terminals of a write head through one of said coils and a second output terminal connected to the other terminal of said write head through the other coil, for writing data in a magnetic disk through said write head.

11. A magnetic disk read/write circuit as claimed in claim 10, wherein said core is either a choke coil or a transfomer.

* * * * *